(12) United States Patent
Kim

(10) Patent No.: US 7,784,337 B2
(45) Date of Patent: Aug. 31, 2010

(54) SENSOR OF TIRE PRESSURE MONITORING SYSTEM

(75) Inventor: Juho Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 64 days.

(21) Appl. No.: 12/245,010

(22) Filed: Oct. 3, 2008

(65) Prior Publication Data

US 2009/0151442 A1  Jun. 18, 2009

(30) Foreign Application Priority Data

Dec. 15, 2007 (KR) .................. 10-2007-0131803

(51) Int. Cl.
*B60C 23/02* (2006.01)
(52) U.S. Cl. .................................... 73/146.8
(58) Field of Classification Search ............ None
See application file for complete search history.

(56) References Cited

U.S. PATENT DOCUMENTS

| | | | | |
|---|---|---|---|---|
| 2,575,849 A | * | 11/1951 | Steven ..................... | 338/37 |
| 2,722,836 A | * | 11/1955 | Stec ........................ | 73/146.4 |
| 3,735,344 A | * | 5/1973 | Weintraub et al. ........ | 73/146 |
| 5,040,562 A | * | 8/1991 | Achterholt ............... | 137/227 |
| 5,774,048 A | | 6/1998 | Achterholt | |
| 6,626,035 B1 | * | 9/2003 | Dent et al. ............... | 73/146.2 |

FOREIGN PATENT DOCUMENTS

| | | |
|---|---|---|
| JP | 2-296510 A | 12/1990 |
| JP | 7-81336 A | 3/1995 |
| JP | 2002-219916 A | 8/2002 |
| JP | 2005-96726 A | 4/2005 |
| KR | 10-0740618 B1 | 7/2007 |
| WO | WO 81/01688 A1 | 6/1981 |

\* cited by examiner

*Primary Examiner*—Andre J Allen
(74) *Attorney, Agent, or Firm*—Morgan, Lewis & Bockius LLP

(57) ABSTRACT

A tire pressure monitoring system sensor includes a body provided with an air inlet that provides fluid communication between the interior of the body and the interior of a tire. A pressure plate slides within the interior of the body by pressure in the tire, in a direction away from the air inlet. A spring biases the pressure plate toward the air inlet. Several sensors are attached to the body, each configured to generate a signal indicative of proximity of the pressure plate. The sensor may further include an air supply valve to supply air to the tire, connected to the body. The body may define an air supply passage through which the air supplied from the air supply valve is supplied to the tire through the air inlet. Three sensors may be provided: one indicative of excessive pressure, one indicative of appropriate pressure, and one indicative of insufficient pressure.

5 Claims, 5 Drawing Sheets

AIR PRESSURE OF TIRE

SENSOR OF TIRE PRESSURE MONITORING SYSTEM

CROSS-REFERENCE TO RELATED APPLICATIONS

The present application is based on, and claims priority from, Korean Application Serial Number 10-2007-0131803, filed on Dec. 15, 2007, the disclosure of which is hereby incorporated by reference herein in its entirety.

FIELD OF THE INVENTION

The present invention relates to a sensor that transmits tire pressure information to a tire pressure monitoring system (TPMS) controller.

BACKGROUND OF THE INVENTION

Air pressure and temperature of vehicle tires are important factors in wearing out the tires. Tire Pressure Monitoring Systems (TPMSes) are sometimes provided to maintain appropriate air pressure.

A direct TPMS generally includes TPMS sensors and a TPMS controller. The TPMS sensors measure temperature and pressure in the tires, and transmit the measured values to the TPMS controller, which processes the signals, and displays the signals on a dashboard. The known sensors are complex, expensive, and heavy.

The above information disclosed in this Background section is only for enhancement of understanding of the background of the invention and therefore it may contain information that does not form the prior art that is already known in this country to a person of ordinary skill in the art.

SUMMARY OF THE INVENTION

A tire pressure monitoring system sensor includes a body provided with an air inlet that provides fluid communication between the interior of the body and the interior of a tire. A pressure plate is slidable within the interior of the body by pressure in the tire, in a direction away from the air inlet. A spring biases the pressure plate toward the air inlet. Several sensors are attached to the body, each configured to generate a signal indicative of proximity of the pressure plate.

The pressure plate may include a permanent magnet, and the sensors may be electrode plates. A transmitting unit may further be provided to transmit information regarding which of the sensors is closest to the pressure plate. A battery may further be provided to power the transmitting unit.

The sensor may further include an air supply valve to supply air to the tire, connected to the body. The body may define an air supply passage through which the air supplied from the air supply valve is supplied to the tire through the air inlet.

Three sensors may be provided: one indicative of excessive pressure, one indicative of appropriate pressure, and one indicative of insufficient pressure.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
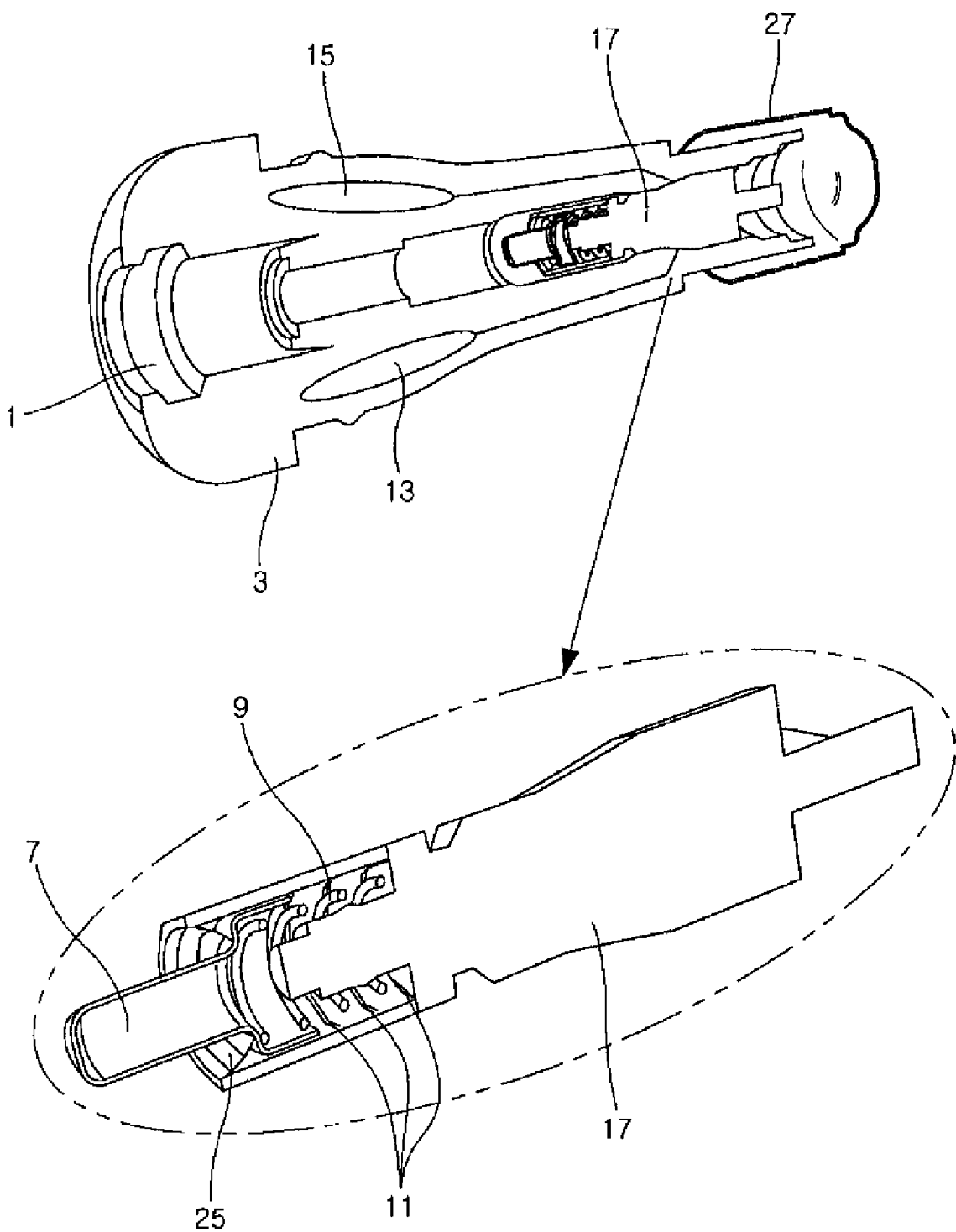
FIG. 1 illustrates an exemplary TPMS sensor.
Figure 2:
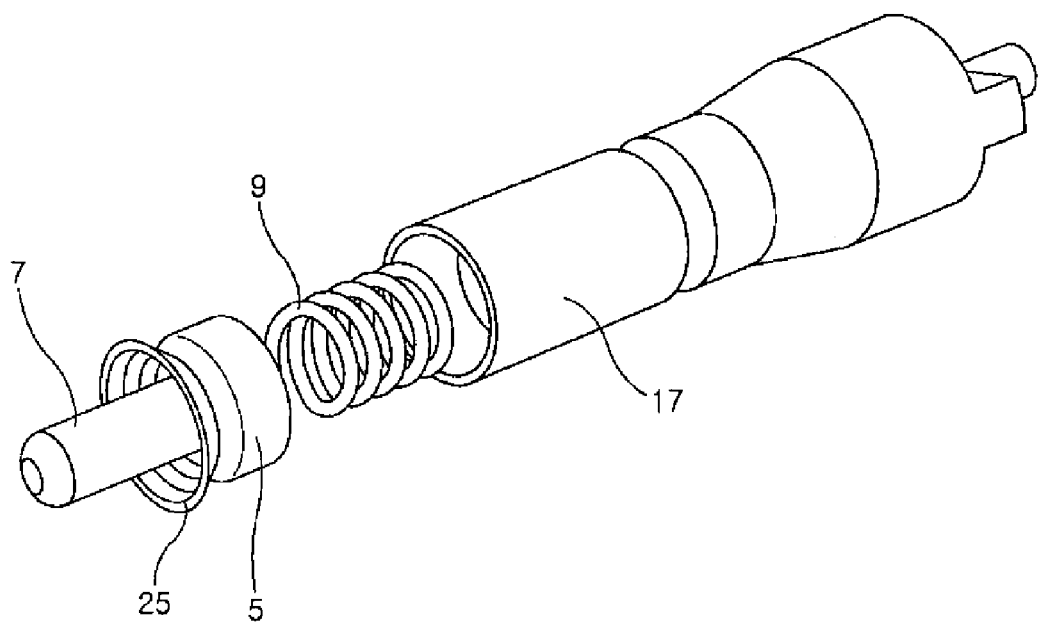
FIG. 2 is an exploded perspective view of the sensor of FIG. 1, with the body removed for clarity.
Figure 3:
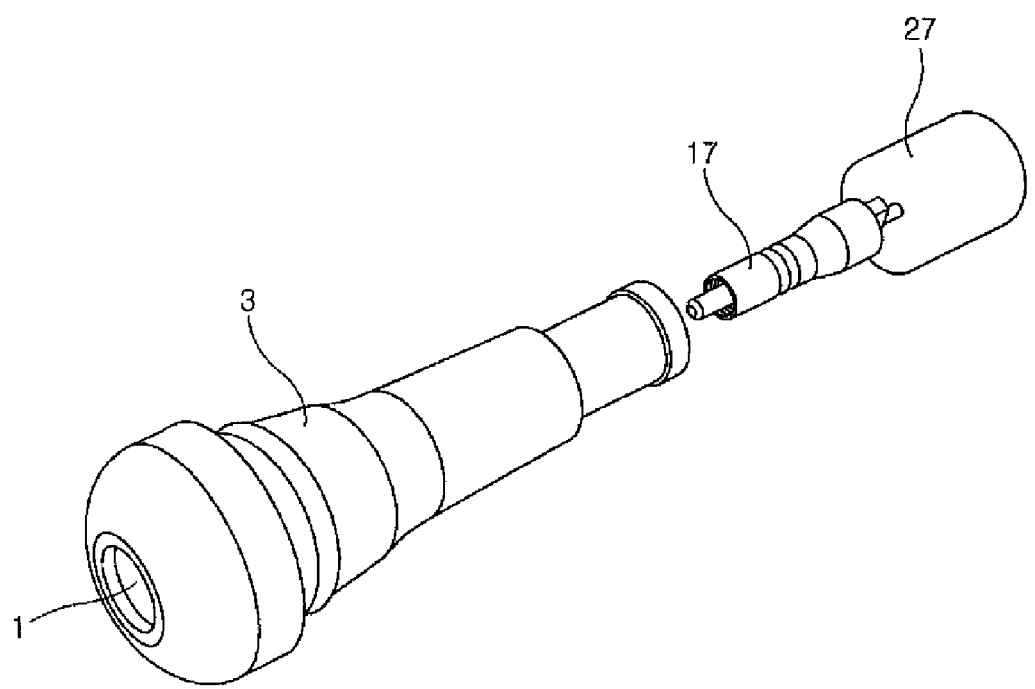
FIG. 3 is an exploded perspective view of the sensor of FIG. 1, including the body.
Figure 4:
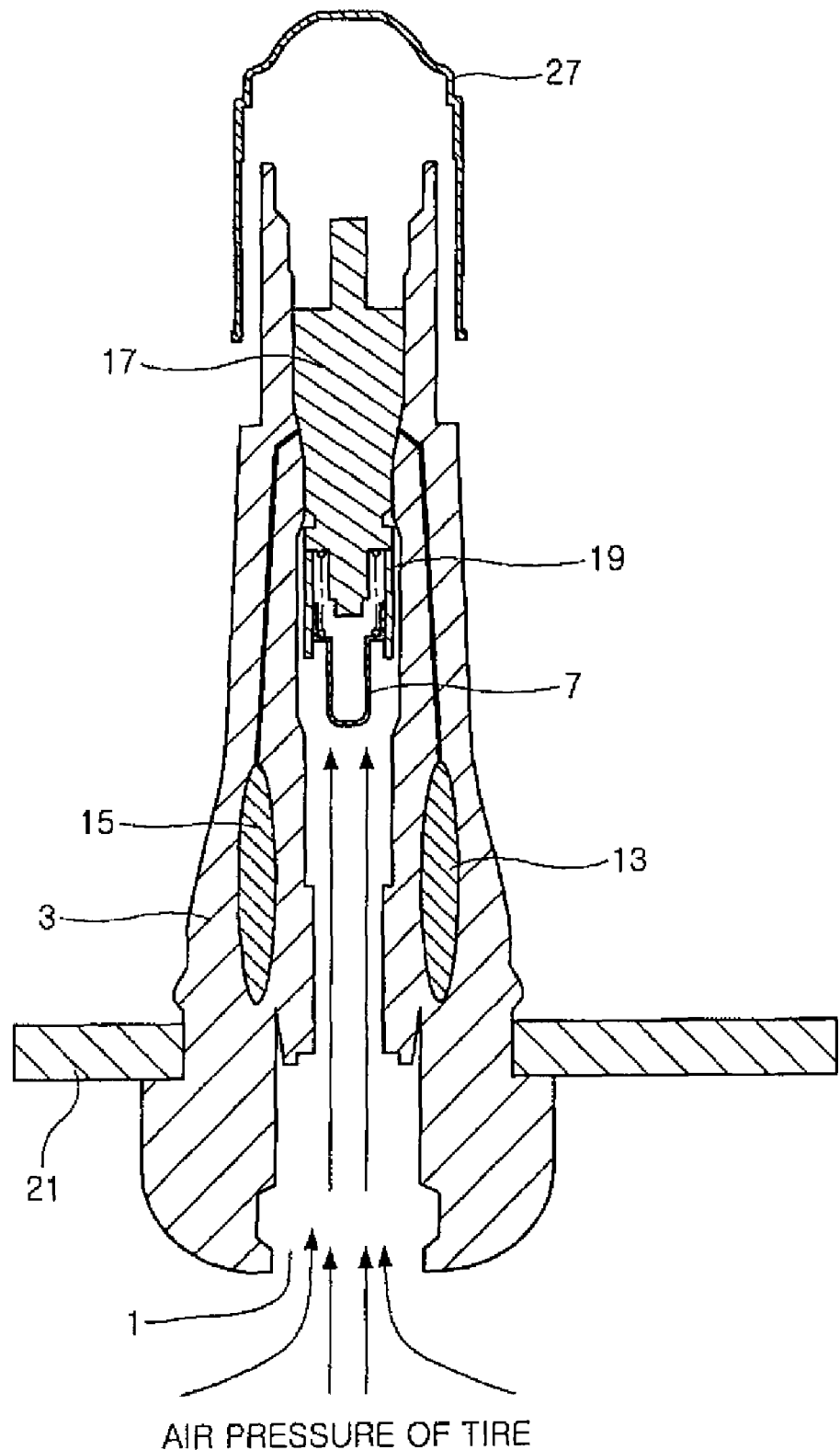
FIG. 4 is a cross-sectional view of the sensor of FIG. 1 mounted on a wheel.

Referring to FIGS. 1-4, a TPMS sensor of a vehicle according to an embodiment of the present invention includes a body 3, a pressure plate 7, a spring 9, a plurality of electrode plates 11, a transmitting unit 13, and a battery 15. The body 3 is provided with an air inlet 1 through which air flows into a tire. The pressure plate 7 slides in body 3 by the air flowing through air inlet 1, and is provided with a permanent magnet 5 (FIG. 2). The spring 9 biases pressure plate 7 opposite the air flowing through air inlet 1. Each of the electrode plates 11 generates eddy currents due to the approach of permanent magnet 5 when pressure plate 7 slides. The transmitting unit 13 is provided in body 3 so as to transmit information relating to which electrode plate 11 generates eddy current at any given time. The transmitting unit 13 transmits this information to a TPMS controller (not shown) by wireless communication. The battery 15 is provided in body 3 to power transmitting unit 13.

When air pressure in a tire (not shown) associated with the sensor changes, pressure plate 7 moves and eddy current is generated from the electrode plate 11 nearest permanent magnet 5. Transmitting unit 13 transmits a signal indicative of which electrode plate 11 that is, and the TPMS controller receives the signal and determines the air pressure.

Pressure plate 7 may be cup-shaped as shown, and protrude toward the inside of the tire at the central portion thereof.

An air supply valve 17, such as those used in the art to supply air to the tire, is integrally connected to body 3 and covered with a cap 27. An air supply passage 19 is formed in body 3 so that the air supplied from air supply valve 17 is supplied to the tire through air inlet 1. Body 3 is fixed to a rim 21 of the wheel.

A cylinder 23 (FIG. 6) in which pressure plate 7 slides is provided in a portion of air supply valve 17 that is positioned in the tire. Spring 9 and electrode plates 11 are provided in cylinder 23. Further, a boot 25 (FIG. 2) is provided at the end of cylinder 23 which is positioned in the tire, so as to suppress the separation of pressure plate 7 from cylinder 23.

That is, a hole is formed at the center of boot 25 and the central portion of pressure plate 7 is disposed in the hole.

Figure 5:
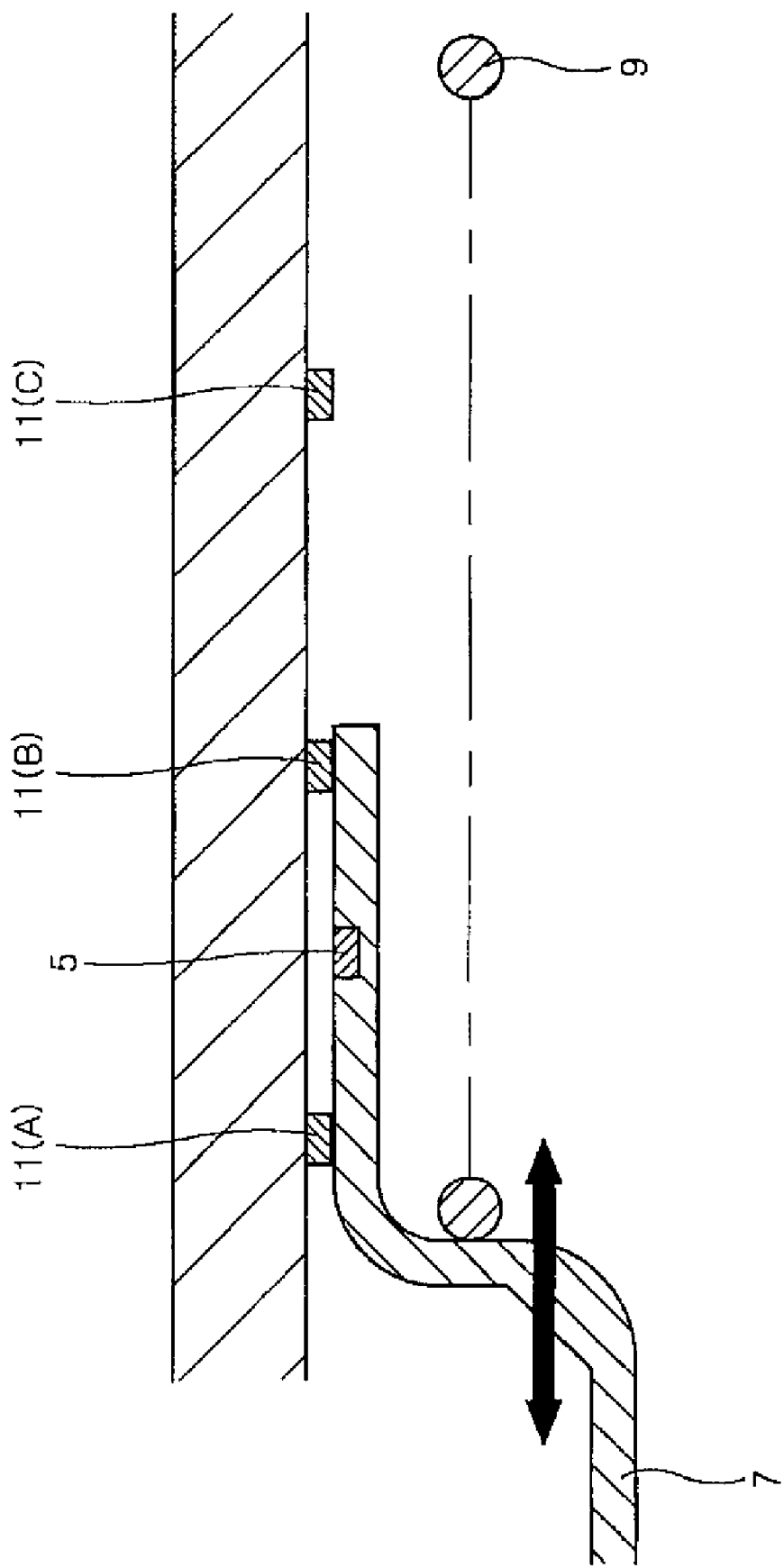
FIG. 5 is a cross-sectional view showing eddy currents generated on an electrode plate due to the movement of a pressure plate.

The higher the air pressure in the tire, the more pressure plate 7 compresses spring 9 and moves toward the outside of the tire. As shown in FIG. 5, state A of insufficient pressure occurs when pressure plate 7 is at the innermost portion of the tire. State B of appropriate pressure occurs when pressure plate 7 is at the intermediate portion of the tire. State C of excessive pressure occurs when pressure plate 7 is at the outermost portion of the tire.

Figure 6:
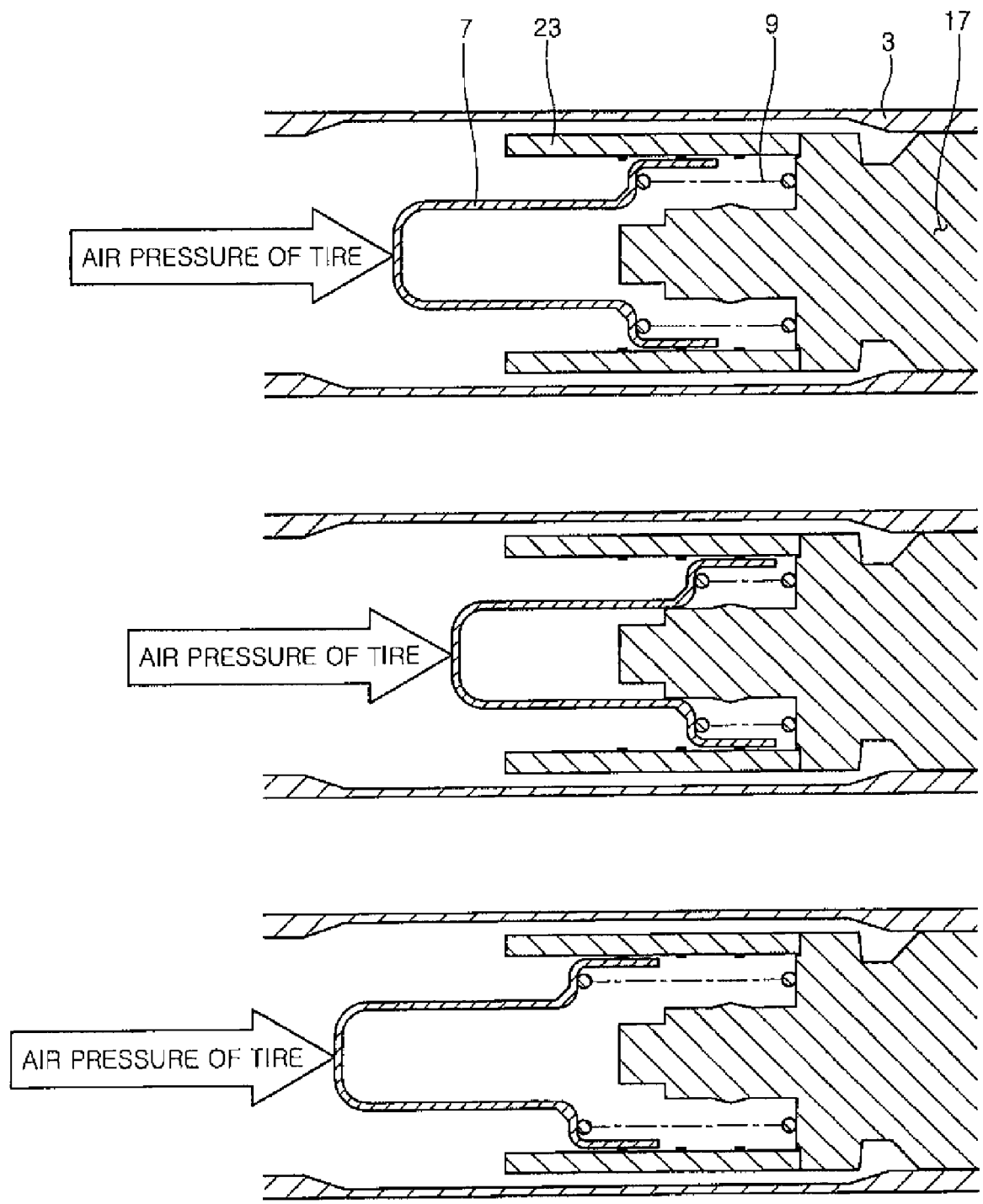
FIG. 6 is a schematic view illustrating the operation of the sensor of FIG. 1.

The first drawing of FIG. 6 shows state B of appropriate pressure, in which the air pressure in the tire is equal to the elastic force of spring 9. In this state, while permanent magnet 5 of pressure plate 7 is nearest electrode plate 11, eddy current is generated from the electrode plate 11(B). The TPMS controller receives the signal indicative of appropriate pressure and displays the normal state of air pressure of the tire to a driver.

The second drawing of FIG. 6 shows state C of excessive pressure of the tire in which pressure plate 7 compresses spring 9 and is further inserted into cylinder 23 as compared to the case of the first drawing. Eddy current is generated from the electrode plate 11(C). The TPMS controller informs a driver that the air pressure is too high.

The third drawing of FIG. 6 shows a state of insufficient pressure of the tire in which pressure plate 7 further protrudes toward the inside of the tire by spring 9 as compared to the case of the first drawing. Electrode plate 11(A) generates eddy current. The TPMS controller informs a driver that the air pressure of the tire is insufficient.

On the basis of the above-mentioned information, a driver supplies or releases air to the tire through the air supply valve.

While some embodiments of the inventive sensor cannot measure the air pressure as precisely as some more complex sensors, it can measure dangerous pressures. It is also cheap, durable, and light.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A tire pressure monitoring system sensor comprising:
a body provided with an air inlet configured to provide fluid communication between an interior of the body and an interior of a tire;
a pressure plate engaged with the interior of the body and slidable therein by pressure in the interior of the tire, wherein the pressure plate includes a permanent magnet;
a spring biasing the pressure plate toward the air inlet; and
a plurality of electrode plates fixed to the interior of the body and arranged with a predetermined distance therebetween along a direction where the pressure plate slides in order to detect states of excessive pressure, appropriate pressure, or insufficient pressure at a position where one of the plurality of electrode plates is detected by the permanent magnet of the pressure plate.

2. The sensor as defined in claim 1, further comprising a transmitting unit to transmit information regarding which one of the plurality of electrode plates is closest to the pressure plate.

3. The sensor as defined in claim 2, further comprising a battery to power the transmitting unit.

4. The sensor as defined in claim 1, further comprising an air supply valve to supply air to the tire, connected to the body, wherein the body further comprises an air supply passage through which the air supplied from the air supply valve is supplied to the interior of the tire through the air inlet.

5. The sensor as defined in claim 1, wherein the plurality of electrode plates comprises a first electrode plate indicative of the excessive pressure, a second electrode plate indicative of the appropriate pressure, and a third electrode plate indicative of the insufficient pressure.

\* \* \* \* \*